April 20, 1943.   G. H. GOTTLIEB   2,316,786
CARTOGRAPHIC DEVICE
Filed Sept. 27, 1940
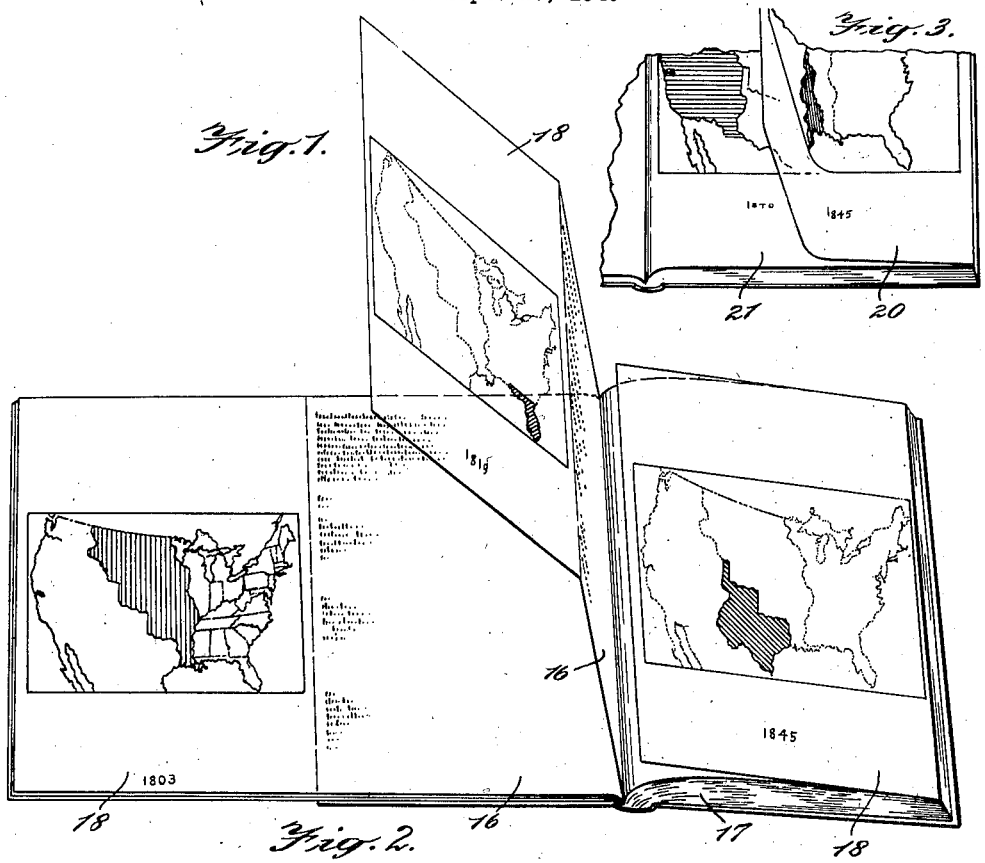
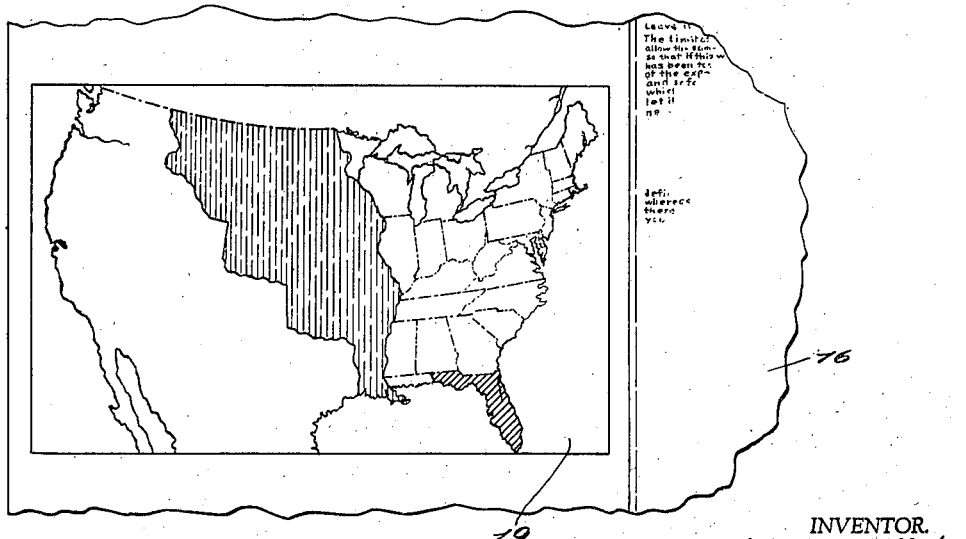
INVENTOR.
Gerald H. Gottlieb
BY
Lackenbach & Hirschman
ATTORNEYS Patented Apr. 20, 1943

2,316,786

UNITED STATES PATENT OFFICE 2,316,786

CARTOGRAPHIC DEVICE

Gerald H. Gottlieb, New York, N. Y.

Application September 27, 1940, Serial No. 358,653

6 Claims. (Cl. 35—40)

The invention relates to apparatus by means of which statistical information of any character may be graphically portrayed and correlated by the use of comparative diagrams, so that the graphical portrayal of such statistical information, instead of being available in a two dimensional study, is capable of correlation with a third dimension, to wit, time. Thus, in specific applications of my invention, for instance, in the field of cartography, the comparative diagrams utilized in accordance with my invention, provide the means for recording and tabulating the characteristics and contours of a space field with a corresponding or correlated time element.

The primary object of my invention is to provide a device by means of which there is made available for ready reference, a complete record or tabulation of correlated data and statistical information, for instance in evolutionary form, by means of which there is arrayed for immediate reference and study a classified display of any group of facts or findings already classified and correlated with respect to spacial characteristics and a time element indicative of changes in the spacial characteristics from period to period or over any specific period of time, including consecutive time spaces, for instance, decennial periods conventionally used for determining periodic census of population, industrial growth, economic standards, or substantially any figures relating to the character, economically, historically, or sociologically, of any given territory.

By means of my novel apparatus, it is possible to produce, for ready reference, an integrated statistical and comparative diagram or series of diagrams of related subjects, such, for instance, as economics, history, geography, geology, and sociology, whereby a complete and harmonious picture of developments, changes, migration statistics, etc., may be studied with respect to the element of time, the element of space, as well as in relation to each other.

The primary object of my invention is to provide a device for making available statistical information by means of comparative diagrams in which any statistical data is reduced to such a basic elemental form for representative correlation of such statistical data that the student, teacher, economist, public health officer, or business man, availing himself of the information thus correlated, and shown by the displayed diagrams, will have before him all relevant facts to which he can constantly refer for the study of past events upon which he can base probabilities of future changes and which, therefore, can act as an accurate guide upon which future procedures, predictions, and distribution of facilities may be predicated.

In its broadest aspect, the present invention contemplates the provision of a plurality of sheets of transparent and flexible material upon which maps, diagrams, statistical data, etc., comparatively disposed with respect to specific areas and time factors, may be imprinted for the ready use of a plurality of such superimposed sheets to ascertain changes from period to period in the correlated information or to secure from such comparative diagrams, maps, and data, statistical information valuable in making further studies or surveys of the particular area or subject.

To illustrate the more basic concept of the invention, for instance, in the field of cartography, as utilized by the map maker, the characteristics and contours of any portion of the earth's surface, for instance, of the United States, may be projected with relation to space, as well as time, to show, for instance, changes effected by historical events, as the acquisition of additional territory or the migration of people from portions of the territorial expanse of the country to another as induced by historical events, for instance, the discovery of gold in a specific territorial subdivision of the country. More specifically, the history and geography of population growth, of crop cultivation, the establishment of manufacturing centers, road construction, mining development, and changes in legal and political status or of substantially any trend or series of events can be recorded, tabulated, and correlated with respect to the representation of specific territorial limits. To illustrate further, a set of maps, for instance, of the United States, may be imprinted upon a series of transparent and flexible sheets of material, one of such sheets showing the present territorial limits of the United States and other sheets successively showing the expansion from the original thirteen colonies to its present territorial configuration by the acquisition of territory by the annexation of the Northwest territory, the purchase of the Louisiana territory, the purchase of Florida, the annexation of Texas, etc., each of such maps or diagrams correlating the territorial acquisition with the element of time when such acquisition took place.

Other specific objects of the invention are to provide such a series of superimposed transparent and flexible sheets, as incorporated in a textbook, for instance, of economics, history, or geography, in which the series of comparative diagrams are correlated with descriptive and explanatory matter disposed in substantially immediate juxtaposition with the diagrams for ready reference by the student of such diagrams and the correlated printed information or explanation.

Specific embodiments of my invention are illustrated in the accompanying drawing, in which Fig. 1 is a plan view of a book, for instance, of history, in the fabrication of which the transparent and flexible sheets, imprinted with comparative diagrams in accordance with my invention, have been incorporated as a part and parcel of the book, and illustrating the method of enfolding the transparent sheets for enclosure when the book is closed, and for placing them in readily accessible position for reference to the pertinent descriptive matter and for the super-position of one diagram upon another;

Fig. 2 is a fragmentary plan view of a portion of the book, showing the superimposition of one of the transparent sheets upon another to illustrate historical events, whereby the area of the Thirteen Original States of the Union was supplemented by the areas acquired by the Louisiana and Florida purchases;

Fig. 3 is a plan view of a portion of the book showing the superimposition of a transparent comparative map page upon a paper page of the book upon which latter a base map has been imprinted.

Referring more particularly to the drawing, in which similar reference characters identify similar parts in the several views, and with specific reference to Figs. 1, 2 and 3, the sheets of transparent material 18 imprinted with different maps are affixed to the outer edges of desired pages 16 of the book 17. The pages of the book thus have an inner portion and a translucent outer portion. When the book is closed and not in use, these sheets or outer portions 18, bearing the maps, lay folded inwardly over the side or inner portion of the page nearest the front cover of the book, this side or inner portion being without text, unless otherwise desired, for instance, to carry instructions for using the maps. When the book is opened in the form shown in Fig. 1 and the printed description upon the adjoining pages 16 is being read, the chart opposite is in full view. When the reader is ready to read the next page, he grasps the left hand edge of the transparent chart, enfolding it to the left and outward from the book, turning the page and extracting the chart in one operation. He then has the chart positive side up, as before. As he progresses in the reading of the book, the chart may remain in full view. In similar manner, other charts 19, interspersed in the text, will be opened outwardly and will be superimposed upon the already enfolded charts 18 so as to register therewith. Thus, as the text is read a cumulative picture constituted of the superimposed transparent sheets, is being assembled. If the reader desires to exclude from his view any of the elements of this composite picture, he has only to fold inwardly, toward the binding, the particular charts which he desires to exclude.

In the particular embodiment illustrated in Figs. 1 to 3, the extreme left hand page of the book of Fig. 1 shows transparent pages with progressive maps superposed, with a map, at the extreme left, showing the Louisiana Purchase of 1803 uppermost and the outline map with the Thirteen Original States underneath. The next page, i. e., the one shown in the process of unfolding, is then superimposed upon the page just described, such next page showing a map of the United States with the territory of the Florida Purchase of 1819 indicated thereon, Fig. 2 showing the composite map produced by the outline map, the superimposed thirteen original states map, the map of the Louisiana Purchase over that, and the map of the Florida Purchase on top. The extreme right hand page shows a map outlining the territory acquired by the Texas Annexation of 1845, which may in turn be superimposed upon the combination map of Fig. 2. Fig. 3 shows the 1845 transparent map 20 in the process of its enfolding to lie over a map 21 of the California acquisition, which may be imprinted upon a page of the book.

In the embodiment or application of my invention hereinabove described and illustrated in the accompanying drawing, the transparent or translucent sheet may be constituted of any of a large variety of materials now available on the market and characterized by high qualities of transparency, flexibility, toughness, durability and uniformity. Examples of such materials are any cellulose derivative products such as Cellophane, Lumarith, Pliofilm and certain Celluloids. These materials, with the present highly developed compositions of inks and pigments, are capable of taking with the necessary degree of permanency any writing, printing or coloring.

Many variations in the specific forms of the embodiments of my invention illustrated and described will occur to those to whom the practical applications of my novel concepts are most likely to appeal, and I desire to be confined therefore in the ambit of my invention to what are specifically designated as the essential features of my invention as set forth in the appended claims without being restricted to the specific embodiments and particular applications referred to and illustrated by me. The possibilities of commercial application of my inventive concept, in providing means for visually correlating selectively various combinations of components of any mass of data, is so vast as to make it impossible to demonstrate by actual reference and illustration, each and every such possible application.

I claim:

1. As a new article of manufacture, a set of assembled pages secured along one marginal edge in substantially the form of a book, certain of said pages each having a portion foldable hingedly along an edge other than said secured edge to overlie the remainder of the page and adapted to be turned in folded position with the page, or to be turned with the page in unfolded condition to an observation position, at least some of said portions being substantially transparent and bearing indicia, whereby any desired combination of said portions may be selectively superimposed in unfolded condition on one another for observation.

2. A book comprising a cover, a plurality of pages of substantially identical rectangular dimensions, certain of said pages being each comprised of an inner portion and an outer portion, each inner portion having its inner edge hingedly secured to said cover along a line intermediate of and parallel to opposite edges of said cover, and each outer portion having an edge joined to the outer edge of an inner portion and folded along a line adjacent said outer edge normally to overlie the inner portion to which it is joined, said outer portions being substantially transparent and bearing indicia, a sheet secured to said cover and bearing indicia and adapted to extend beyond the normal boundaries of said pages in a direction at right angles to said line at which said pages are hingedly secured, and in a position to be selectively covered by any combination of said outer portions when those selected are unfolded to extended position.

3. A book comprising a cover, a plurality of pages of substantially identical rectangular dimensions, at least three of said pages being each comprised of an inner portion and an outer portion, each inner portion having its inner edge secured to said cover along a line intermediate of and parallel to opposite edges of said cover, and each outer portion having an edge joined to the outer edge of an inner portion and folded along a line adjacent said outer edge normally to overlie the inner portion to which it is joined, said outer portions being substantially transparent and bearing indicia, a sheet secured to said cover and bearing indicia and adapted to extend beyond the normal boundaries of said pages in a direction at right angles to line at which said pages are hingedly secured and in a position to be selectively covered by any combination of said outer portions when those selected are unfolded to extended positions.

4. A book comprising a cover comprised of three substantially identical rectangular sections with parallel fold lines separating said sections, a plurality of pages, at least three of said pages being each comprised of an inner portion and an outer portion, said inner portions all having their inner edges secured to said cover along one of said fold lines, and each outer portion having an edge joined to the outer edge of an inner portion and folded along a line adjacent said outer edge normally to overlie the inner portion to which it is joined when the page so comprised is turned to either side of the fold line of the cover along which the pages are secured, the section outwardly of the other fold line of said cover bearing indicia adapted to be covered selectively by any combination of said outer page portions when those selected are unfolded to extended position with those selected being in substantially exact registration with each other.

5. In a device as defined in claim 2, said inner portions on one face bearing indicia having a graphic relationship to the indicia borne by the transparent outer portion foldably joined thereto.

6. In a device as defined in claim 2, said inner portions bearing indicia on the face adapted normally to be overlain by its transparent outer portion foldably joined thereto, which last named indicia relates to the indicia on said outer portion, the other face of said inner portions each bearing explanatory indicia of the relationship between the indicia on its outer portion and that on said sheet when its outer portion is unfolded to extended position overlying said sheet.

GERALD H. GOTTLIEB.